United States Patent

Dowling et al.

[15] 3,657,636

[45] Apr. 18, 1972

[54] THERMALLY STABLE COIL ASSEMBLY FOR MAGNETIC SUSCEPTIBILITY LOGGING

[72] Inventors: Donald J. Dowling; George R. Atwood, both of Houston, Tex.

[73] Assignee: Texaco Inc., New York, N.Y.

[22] Filed: Jan. 2, 1970

[21] Appl. No.: 328

[52] U.S. Cl. .................................................. 324/6
[51] Int. Cl. ........................... G01v 3/10, G01v 3/18
[58] Field of Search .............................. 324/3, 4, 6

[56] References Cited

UNITED STATES PATENTS

| | | | |
|---|---|---|---|
| 3,094,658 | 6/1963 | Bravenec et al. | 324/6 |
| 3,124,742 | 3/1964 | Schneider | 324/6 X |
| 3,147,429 | 9/1964 | Moran | 324/6 |
| 3,327,203 | 6/1967 | Attali | 324/6 |
| 3,466,533 | 9/1969 | Doll et al. | 324/6 |

Primary Examiner—Gerard R. Strecker
Attorney—Thomas H. Whaley and Carl G. Ries

[57] ABSTRACT

A borehole magnetic susceptibility apparatus is disclosed which includes a transmitter search coil, a receiver search coil, both wound over a low thermal co-efficient core element such as glass, an AC power supply coupled with the transmitter search coil for generating an alternating magnetic field which after passing at least in part through the earth formation couples magnetically with the receiver search coil for inducing therein a voltage signal dependent in part on the magnetic susceptibility of the formation and which is in quadrature phase relationship with the transmitter coil current. The apparatus includes a nulling coil having a primary winding connected in series with the transmitter coil and a secondary winding connected in series opposition with the receiver coil to render detectable the small variations of the quadrature phase signal representing the magnetic susceptibility. A thermally stable and shock resistent sub-assembly of the transmitter and receiver search coils is provided for improved environmental stability of the tool. The method of subjecting the earth formation to an alternating magnetic field to induce therein a field which depends on the magnetic susceptibility of the formation, detecting the induced magnetic field by permitting it to act on a receiver element to induce therein a first signal which depends on the magnetic susceptibility of the formation, generating a reference second signal representing the susceptibility of a reference medium, and generating a third signal corresponding the difference between the first and second signal whereby the third signal represents the magnetic susceptibility of the formation with respect to the magnetic susceptibility of the reference medium.

5 Claims, 3 Drawing Figures

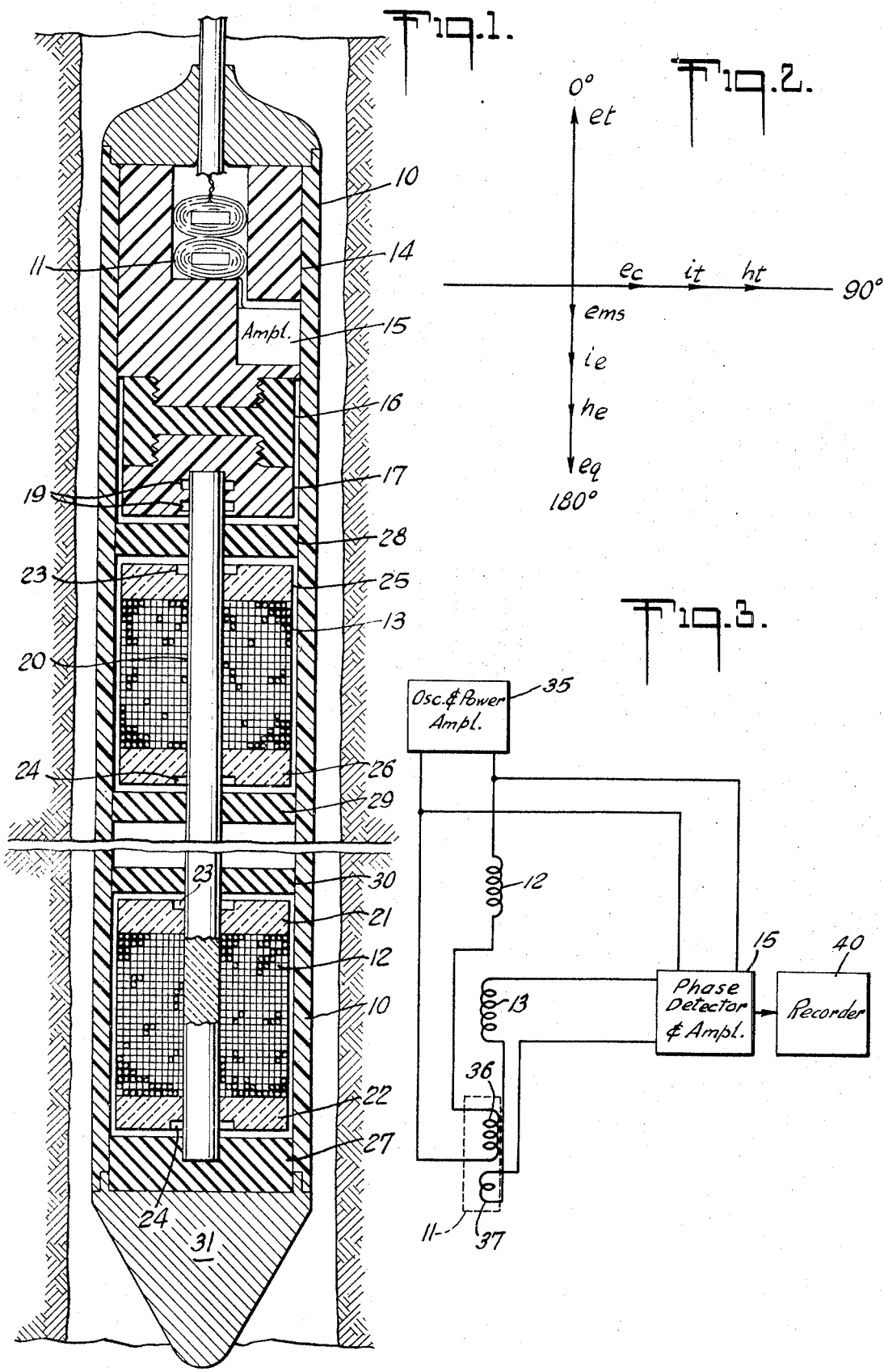

THERMALLY STABLE COIL ASSEMBLY FOR MAGNETIC SUSCEPTIBILITY LOGGING

BACKGROUND OF THE INVENTION

This invention relates to methods and apparatus for borehole logging and more particularly to methods and apparatus for determining the magnetic properties of the earth's strata adjacent a borehole.

In prospecting for oil, gas deposits, and other minerals, it is essential to have as much information as possible about the earth's strata at various depths to help identify the materials present and the age of the various formations. One commonly used method is borehole induction logging for determining the electrical conductivity of the formations such as is disclosed by G. Attali in U.S. Pat. No. 3,327,203. Another method is logging to determine the magnetic properties of the earth's material such as the magnetic susceptibility or permeability.

While the information obtainable by the latter method is highly desirable, serious problems are encountered when prior art devices are used for magnetic logging. The reason is that the magnetic anomaly of earth formations is generally of a smaller magnitude than is the electrical conductivity anomaly. Therefore, logging signals representing the magnetic properties are generally of a much smaller order of magnitude. As a result such factors as electrical noise and temperature stability of the logging instrument become far more critical. Thus, a logging instrument for obtaining magnetic information tends to interpret temperature changes and other disturbances as variations of the magnetic properties of the earth formations. Accordingly, prior art devices, such as described in the aforementioned Attali patent, cannot be used for magnetic logging. Furthermore, such prior art devices have been directed toward the problem of obtaining electrical conductivity data. Consequently, they are constructed to treat the signals representing the magnetic properties of the formations as background noise.

In magnetic susceptibility logging as is proposed herein a solenoidally wound transmitter coil having its axis maintained approximately parallel with the borehole is excited by an AC voltage so that an alternating magnetic field is applied to the earth's strata. A receiver coil is suitably positioned in the tool where it is subjected to the magnetic field as it is altered by the magnetic anomalies of the material surrounding the borehole. The magnetic field results in electrical currents which flow in a more or less circumferential pattern around the borehole and which vary with the conductivity of the formation. As a result of these currents there is induced in the receiver coil a voltage signal which is in phase with the transmitter coil current. In quadrature relationship with this voltage signal is the magnetically induced voltage signal of the receiver coil due to its magnetic coupling with the transmitter coil. A significant portion of that coupling is through the earth's formation surrounding the borehole. The magnetic anomalies, hence, appear as variations of the quadrature signal. These variations are much smaller than the "in-phase" signal representing the conductivity of the formation. The orders of magnitude which can be expected are approximately as follows. A transmitter coil current of approximately 300 ma. can result in an in-phase conductivity signal in the order of magnitude of about 500 mv. and an induced quadrature phase signal of about 28 mv. with variations of approximately 0.05 mv. due to the magnetic anomalies of the formation. It can be seen that in order to render detectable the small signal variations representing the magnetic anomalies it is desirable to subtract from the total magnetically induced signal a constant AC signal approximately equal to what the magnetically induced signal would be if the logging tool is surrounded by a medium of known magnetic properties, such as, for example, air. To provide such a subtraction signal we propose to utilize a nulling coil in a novel manner resulting in an accurate subtraction signal which has no detrimental effect on the quadrature signal representing the magnetic anomalies.

The use of a conventional transformer for this purpose such as is disclosed in U.S. Pat. No. 3,327,203 is unsatisfactory for magnetic property logging since such a transformer would be sensitive to temperature variations and to the earth's magnetic field to an extent which would obscure the variations of the magnetically induced signal sought to be detected. We expect that such variations can result in unsubtracted residual signals in the order of magnitude of approximately 1 mv. Even greater residual signals can be expected if other prior art nulling devices are used. Comparing these residual signals with the aforementioned magnetic anomalies signal it can be seen that prior art nulling devices and techniques are inadequate for magnetic property logging.

We have found that a nulling coil constructed and utilized as hereinafter disclosed solves the aforementioned problems and effectively eliminates any interference from the transmitter coil field. Also, the nulling coil we propose reduces sensitivity to variations of the earth's magnetic field to a tolerable level. It is interesting to note that coil pairs are usually wound over highly permeable core elements. The use we propose however involves construction of the coil such that it tends to provide a high degree of temperature stability and interference rejection.

Further improvements we propose include a unique design of the transmitter and receiver coils to provide high environmental stability with a desired magnetic penetration in the formation.

Our invention provides a logging apparatus and method by which a magnetic property signal is generated of sufficient strength and environmental stability such that any signals representing the electrical conductivity of the formation can be excluded by presently known phase detection equipment, whereby the magnetic susceptibility can be reliably logged with results heretofore unobtainable.

SUMMARY

In accordance with a preferred aspect of the invention there is provided a magnetic susceptibility logging apparatus which includes a transmitter search coil and a receiver search coil both solenoidally wound over a core material having a relatively low coefficient of thermal expansion, and an electrical power supply for providing alternating current power to the transmitter search coil for generating an alternating magnetic field. The apparatus also includes a logging tool case for supporting the transmitter search coil in the borehole in a position such that the earth formation is subjected, at least in part, to the alternating magnetic field. The receiver coil is magnetically coupled with the transmitter coil such that the magnetic field after passing through the earth formation acts upon the receiver coil and induces therein an alternating voltage signal which is dependent in part on the magnetic susceptibility of the formation and which is in quadrature phase relationship with the alternating current in the transmitter coil. The apparatus also includes a nulling coil having a primary winding connected in series with the transmitter coil and a secondary winding connected in series opposition with the receiver coil. The nulling coil is mounted in the case in a position such that the aforementioned magnetic field has substantially no effect on the primary and secondary windings. The voltage induced in the secondary is subtracted from the receiver coil voltage to render detectable the portion of the receiver coil voltage representative of the magnetic susceptibility of the earth formation.

In accordance with another aspect of the invention an improved construction of the search coils is provided wherein they are solenoidally wound over a common mandrel of a material having a relatively low coefficient of thermal expansion such as, for example, glass. A preferred axial spacing on the mandrel is provided in order to obtain a desired penetration into the formation. Also, supporting end caps of boron nitride material are provided for the windings of the transmitter and receiver search coils which in conjunction with the glass mandrel result in excellent temperature stability of the logging tool.

Another aspect of the invention resides in a method for providing a signal representative of the magnetic susceptibility of the earth formation with respect to the susceptibility of a reference medium including the steps of subjecting the earth formation to an alternating magnetic field for inducing therein an alternating field which depends upon the magnetic susceptibility of the formation, detecting the induced magnetic field by permitting the field to act on a receiver element placed in the vicinity of the formation for inducing in the receiver element a first alternating voltage signal which depends on the magnetic susceptibility of the formation and generating a reference second alternating voltage signal corresponding to the value the induced first signal would assume if the first signal were provided with respect to a reference medium of known magnetic susceptibility. The method includes the further step of providing a magnetic susceptibility output third signal corresponding to the difference between the first and second signals whereby the output third signal is representative of the susceptibility of the earth formation with respect to the susceptibility of the reference medium.

In view of the foregoing it is an object of the invention to provide a magnetic susceptibility logging tool.

Another object of the invention is to provide an improved logging tool of sufficient sensitivity to provide data of the magnetic susceptibility of the earth formation adjacent a borehole.

Another object of the invention is to provide a logging tool of improved environmental stability which is suitable for the purpose of magnetic susceptibility logging.

Another object of the invention is to provide a method for generating a signal representative of the magnetic susceptibility of the earth formation adjacent a borehole with respect to the susceptibility of a known medium.

These and other object, advantages and features of the invention, will be more fully understood by referring to the following descriptions and claims taken in conjunction with the accompanying drawings.

BRIEF DESCRIPTION OF THE DRAWINGS

FIG. 1 is a simplified cross-sectional view of a logging tool illustrating features of the invention.

FIG. 2 is a vector diagram illustrating the phase relationships between the more significant voltages and currents of the transmitter and receiver coils.

FIG. 3 is a schematic diagram partly in block form illustrating electric circuit features of a logging system in accordance herewith.

DESCRIPTION OF THE PREFERRED EMBODIMENTS

Referring now to FIG. 1 a long cylindrical tool case 10 is provided which is made of a suitable non-metallic material having reasonably high mechanical strength such as paper impregnated bakelite. A nulling coil 11 is provided mounted in the upper portion of the case. A solenoidally wound transmitter coil 12 is provided in the lower portion of the logging tool. A solenoidally wound receiver coil 13 is located in the central portion of the case 10. To provide the required subtraction voltage the nulling coil 11 includes a primary winding wired in series with the transmitter coil 12 and a secondary winding wired in series opposition with the receiver search coil 13. The core element of the nulling coil is toroidally shaped and made of boron nitride. The primary winding is toroidally wound over the core element and the secondary winding is in turn wound over the primary. The construction and mounting of the nulling coil is critical since any relative movement between the primary and secondary windings results in a change of the voltage in the secondary which can be large enough to be misinterpreted as a change of the magnetic properties of the earth formation. Thus, it is important that a material having a low coefficient of thermal expansion be used for the core element. Accordingly, a non-ferrous material is preferred. We have found that successful operation can be expected if the material has a coefficient of thermal expansion less than $1.9 \times 10^{-5}$ inches per inch per °F. Also, it is preferable that the core material be machineable since its fabrication involves boring and a turning operation. Accordingly, the use of boron nitride is preferred.

The nulling coil 11 is mounted with its toroidal axis approximately orthogonal to the magnetic axis of the transmitter coil 12. We have found that in this position any magnetic interference from the transmitter coil is maintained to a minimum since any induced interfering voltages tend to cancel themselves. Also, we have found that a further advantage of a toroidal nulling coil having a boron nitride core is that it is relatively impervious to the earth's magnetic field. Accordingly, the use of shielding is not required.

A housing member 14, is provided, in which is mounted the nulling coil 11 by conventional techniques. The external shape of the housing 14 is circular and is sized to fit snugly within the inside diameter of the case 10. Also, the housing 14 includes a cut-out region in which is mounted a conventional solid state amplifier and phase detector 15, which amplifies the magnetic susceptibility signal. Extending from the lower portion of the housing 14 is a cylindrical extension having circumferential serations. Over this extension is vulcanized a neoprene rubber support member 16. Beneath the rubber support 16 is provided a mandrel end cap 17 which on its upper portion also includes a cylindrical extension having circumferential serations and which is in turn vulcanized in the lower portion of the rubber support member 16. There is provided in the lower portion of the end cap 17 a bore having a pair of internally recessed grooves 19. It is preferred that the end cap 17 be made of a non-metallic material having reasonably high mechanical strength such as a linen impregnated bakelite. A pyrex-type glass mandrel 20 is provided which closely fits in the bore of the end cap 17 and extends downwardly therefrom in approximate axial alignment with the case 10. The use of pyrex glass is preferred due to its very low coefficient of thermal expansion and relatively high mechanical strength. Accordingly, any thermally caused relative movement between the transmitter and receiver coils is kept to minimum. We have found that successful operation results if a material is used which has a thermal coefficient less than about $1.6 \times 10^{-5}$ inches per inch per °F. It is nevertheless preferred that a relatively strong glasseous material be used having a thermal coefficient in the range of about $0.5 \times 10^{-5}$ to $1.5 \times 10^{-5}$ inches per inch per °F. The mandrel 20 is fixed to the bore of the end cap 17 by utilizing an appropriate cement in the grooves 19.

The glass mandrel 20 extends downward through a major portion of the balance of the logging tool. The transmitter coil 12 is solenoidally wound over the lower portion of the glass mandrel 20 between a pair of supporting end caps, 21 and 22, which are of boron nitride material. The end caps, 21 and 22 are fitted closely over the mandrel 20 and include counter-bored recesses, 23 and 24 respectively, where a suitable cement is used for fixing the end caps to the glass mandrel. The transmitter coil 12 is tightly wound between the boron nitride end caps whose coefficient of thermal expansion is sufficiently close to that of the glass mandrel so that thermally caused movement of the transmitter coil windings due to self-heating and the temperature extremes encountered in the borehole is nearly eliminated. The receiver search coil 13, is similarly mounted between boron nitride end caps 25 and 26 and is located in the central portion of the logging tool axially spaced apart from the transmitter search coil a predetermined distance to obtain magnetic coupling therewith through the earth's formation surrounding the borehole.

The lower end of the mandrel 20 is supported by a neoprene rubber plug 27 which fits closely in the case 10. To provide radial support for the mandrel 20, several cylindrically shaped supports of neoprene rubber are provided which fit closely over the mandrel and also in the case 10. These supports are axially spaced at various points along the length of the mandrel. Three of these supports, 28, 29, and 30 are shown. The lower end of the logging tool terminates in a conventional conically shaped and weighted tool end 31, which is conventionally fastened to the case 10.

Generally it is preferred to provide a sufficient number of windings of the transmitter coil 12 to generate as strong a magnetic field as possible within the space available in the logging tool. However, there are many limitations which constrain the design of the transmitter coil. Thus, if relatively high current and large number of windings are used for this coil there is a tendency for excessive self-heating which adversely affects the accuracy of the tool. We have found that operable results are obtained if the transmitter coil is designed to provide a total magnetic field strength passing through the core in the range of 20 to 60 Oersteds RMS. Best results are obtained when it is designed to provide a field in the range of about 35 to 40 Oersteds. We consider this the best compromise which results in a sufficiently strong magnetic field to obtain reliable susceptibility data and which limits the aforementioned self-heating problem. Accordingly, if a 26 AC volts power supply at the logging tool is provided it is preferred that the transmitter coil have approximately 1680 turns of No. 22 AWG wire. This results in transmitter coil currents in the range of 250 ma. to 300 ma.

The receiver coil 13 must be axially spaced from the transmitter coil a sufficient distance to permit magnetic coupling with a meaningful penetration of the field in the formation. Yet the magnetic field strength at the receiver coil must be sufficiently strong to provide detectable magnetic susceptibility signals. We have found that an axial distance between the nearest windings of the transmitter and receiver coils of about 200 to 400 percent of the axial length of the transmitter coil is preferred. To provide the desired sensitivity of the receiver coil it is preferred that approximately 9,600 turns of No. 30 AWG wire be used for this coil. This preferred configuration results in an induced receiver coil voltage in the range of 25 to 28 mv. RMS when the tool is exposed to air.

It should be noted that an important aspect of the construction described above, is that the mandrel 20 with the associated transmitter and receiver coils is a resiliently suspended sub-assembled unit. That is, it is suspended both in the radial and axial directions in the rubber mounting provisions discussed. Also, this sub-assembly is least sensitive to temperature variations, due to the thermal compatability of the boron nitride end caps and the glass mandrel. This construction results in environmental stability of the logging tool both with respect to temperature variations and vibrations encountered in the borehole.

It should also be noted the use of both ferrous and non-ferrous metals should be avoided anywhere in the aforementioned assembly of mandrel and coils. The reason is that any metals would tend to confine the transmitter coil magnetic field and would also result in excessive eddy current losses in the metallic parts. Also, such metallic parts would possess magnetic susceptibilities large in comparison with the susceptibility of the earth formation and their use would accordingly reduce the sensitivity of the logging tool.

The phase relationships between the various currents and voltages is best understood by referring to FIG. 2, in which is shown a vertical vector $e_t$, representing the transmitter coil excitation voltage and which is drawn vertically, representing 0° phase. This results in a transmitter coil current, $i_t$, which lags $e_t$ by a phase angle of 90°. In phase with $i_t$ is $h_t$ representing the magnetic field generated by the transmitter coil. Lagging $h_t$ by a further 90° phase relationship is $i_e$ representing the eddy currents in the earth formation induced by the rate of change of $h_t$. This, in turn, gives rise to a voltage induced in the receiver coil $e_c$ which is in quadrature relationship with $i_e$. This signal is directly related to the conductivity of the earth formation. In phase with $i_e$ is $h_e$ representing the small magnetic field associated with the eddy currents in the earth formation. In quadrature relationship with $h_t$ is the magnetically induced receiver coil voltage $e_q$, which is induced by the rate of change of $h_t$. The magnetic susceptibility voltage appears as a small component part of $e_q$ and is identified $e_{ms}$. Accordingly, the magnetic susceptibility voltage to be detected is in quadrature relationship with the transmitter coil current $i_t$.

Referring now to FIG. 3, which is a schematic diagram of the logging tool and the associated electronics, partly in block diagram form, a conventional oscillator and power amplifier 35 is provided which is located overhead for transmitting power to the logging tool through suitable cable means. The oscillator, and power amplifier 35, are adapted to provide electrical power having a frequency of about 1,000 Hz. and a voltage of about 26v. RMS to the logging tool. Wired in series with the power amplifier 35 are the transmitter coil 12, and the primary winding 36 of the nulling coil 11. The secondary winding 37, of the nulling coil, is connected in series opposition with the receiver coil 13 and provides a net signal which is carried to a phase detector and amplifier 15 which is mounted in the logging tool. The phase detector and amplifier rejects the component of the receiver coil voltage which is in phase with the transmitter coil current and amplifies the net quadrature phase component which represents the magnetic susceptibility of the formation. This amplified signal is transmitted through suitable electrical wiring to the surface where it is recorded by a recorder 40.

It is important, in order for the magnetic susceptibility signal to have a meaningful value, that the nulling coil include the proper number of windings in the primary and secondary such that the net voltage provided by the receiver coil be as low as possible to represent the magnetic susceptibility of the formation. Thus, it is preferred that the number of turns of the nulling coil windings be determined such that the net receiver coil voltage be near zero when the logging tool is in a medium of known magnetic properties such as in air. By this method a meaningful calibration is obtained of the magnetic susceptibility signal.

When the invention has been described with a certain degree of particularity, it can nevertheless, be seen by the examples hereinabove set forth that many modifications and variations of the invention may be made without departing from the spirit and scope thereof.

We claim:

1. Apparatus for logging the magnetic susceptibility of the earth formation adjacent a borehole comprising:
   a. a solenoidally wound transmitter search coil including a glass core which has a coefficient of thermal expansion no greater than $1.6 \times 10^{-5}$ inches per inch per °F;
   b. an electrical power supply for providing alternating current power for said transmitter search coil whereby an alternating magnetic field is generated;
   c. means including a logging tool case for supporting said transmitter search coil in said borehole in a position such that the earth formation adjacent said borehole is subjected at least in part to said magnetic field;
   d. a solenoidally wound receiver search coil including a glass core which has a coefficient of thermal expansion no greater than $1.6 \times 10^{-5}$ inches per inch per °F. said receiver search coil being mounted in said case (c) in a position axially spaced apart from said transmitter coil (a) a predetermined distance to obtain magnetic coupling with said transmitter coil at least in part through the earth formation adjacent said borehole whereby said alternating magnetic field induces in said receiver coil a first alternating voltage signal dependent in part on the magnetic susceptibility of said earth formation and which is in quadrature phase relationship with the alternating current in said transmitter coil;
   e. a nulling coil having a primary winding connected in series with said transmitter coil and a secondary winding connected in series opposition with said receiver coil said nulling coil being mounted in said case (c) in a position such that said alternating magnetic field has substantially no affect on said primary and secondary winding thereof whereby the induced voltage in said secondary winding tends to be subtracted from said receiver coil voltage rendering detectable the portion of said receiver coil voltage representative of the magnetic susceptibility of the earth formation; and, f. phase sensitive detecting means coupled to said receiver search coil for deriving a magnetic susceptibility signal voltage corresponding to the portion of said receiver search coil voltage representative of the magnetic susceptibility of the earth formation in quadrature phase relationship with the alternating current in said transmitter coil.

2. The apparatus of claim 1 wherein the core of said transmitter search coil (a) and said receiver search coil (d) comprises a mandrel core common to both of said coils wherein each of said coils is a plurality of electrical windings on said mandrel and wherein the axial distance of the nearest winding of said receiver search coil to the nearest winding of said transmitter search coil is in the range of about 200 to 400 percent of the axial length of said transmitter search coil on said mandrel.

3. The apparatus of claim 1 wherein each of said transmitter and receiver search coils includes a pair of end caps of boron nitride material each having an opening adapted to fit closely over said mandrel for providing axial support for the windings of said transmitter and receiver coils, said end caps being cemented to said mandrel.

4. The apparatus of claim 1 wherein said transmitter coil (a) includes a sufficient number of windings to provide said magnetic field as a total magnetic field the strength of which is about 20 to 60 Oersteds.

5. Apparatus for logging the magnetic susceptibility of the earth formation adjacent a borehole comprising:
 a. a glass mandrel having a coefficient of thermal expansion no greater than $1.6 \times 10^{-5}$ inches per inch per °F;
 b. a transmitter search coil including a multiplicity of electrical windings solenoidally wound over said mandrel;
 c. means including a logging tool case for supporting said mandrel in said borehole in a position such that the magnetic axis of said transmitter search coil is approximately parallel with the axis of said borehole;
 d. an electrical power supply for providing alternating current power for said transmitter search coil whereby an alternating magnetic field is generated which passes at least in part through said earth formation;
 e. a receiver search coil solenoidally wound over said mandrel axially spaced apart from said transmitter search coil a predetermined distance to obtain magnetic coupling with said transmitter coil at least in part through said earth formation by a desired penetration, whereby said alternating magnetic field induces in said receiver coil a first alternating voltage signal dependent in part on the magnetic susceptibility of said earth formation and which is in quadrature phase relationship with the alternating current in said transmitter coil;
 f. at least one end cap of boron nitride material for each of said search coils for providing axial support for the electrical windings thereof, each of said end caps including an opening adapted to fit closely over said mandrel;
 g. a nulling coil having a primary winding connected in series with said transmitter coil and a secondary winding connected in series opposition with said receiver coil said nulling coil being mounted in said case (c) in a position such that said alternating magnetic field has substantially no affect on said primary and secondary windings thereof, whereby the induced voltage in said secondary winding tends to be subtracted from said receiver coil voltage rendering detectable the portion of said receiver coil voltage representative of the magnetic susceptibility of the earth formation; and,
 h. phase sensitive detecting means coupled to said receiver search coil for deriving a magnetic susceptibility signal voltage corresponding to the portion of said receiver search coil voltage representative of the magnetic susceptibility of the earth formation in quadrature phase relationship with the alternating current in said transmitter coil.

* * * * *